May 8, 1928.  1,668,711
C. T. EVANS
REGULATION OF ELECTRIC CIRCUITS
Filed Aug. 2, 1923    2 Sheets-Sheet 1
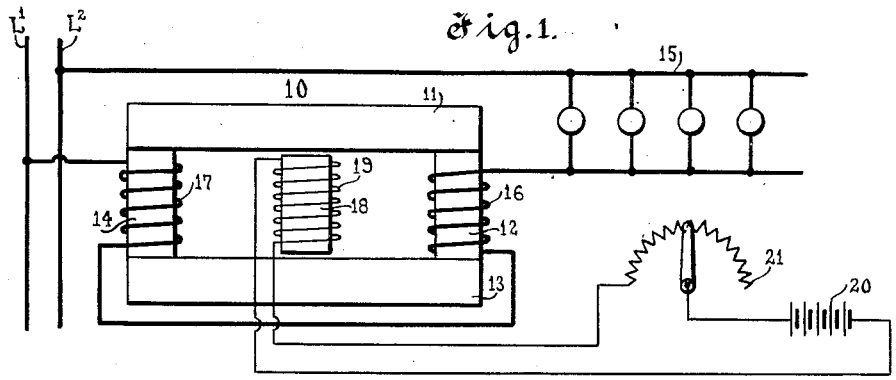
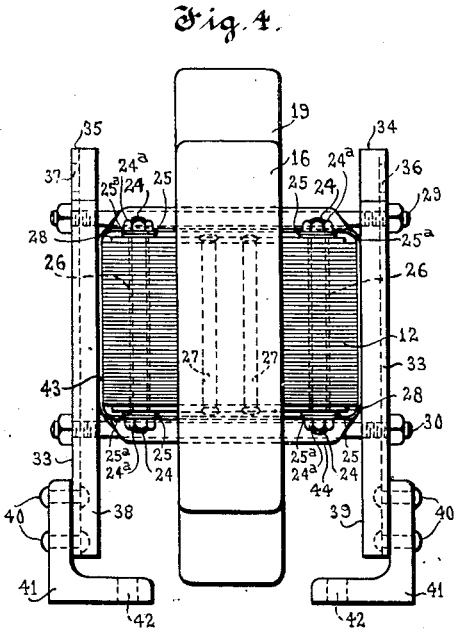
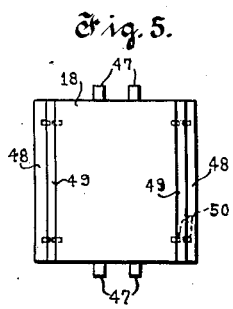
INVENTOR
Clarence T. Evans
BY
Frank W. Hubbard
ATTORNEY May 8, 1928.

C. T. EVANS 1,668,711

REGULATION OF ELECTRIC CIRCUITS

Filed Aug. 2, 1923

INVENTOR
Clarence T. Evans
BY
Frank H. Hubbard
ATTORNEY

Patented May 8, 1928.

1,668,711

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATION OF ELECTRIC CIRCUITS.

Application filed August 2, 1923. Serial No. 655,179.

This invention relates to regulation of electric circuits, and more particularly to energization and intensity control of alternating current circuits for lighting and other purposes.

In practice heretofore in construction regulators of the variable inductance type the magnetic circuits have been so arranged by using two or more balanced alternating current windings that the tendency for the alternating current flux to thread the direct current winding was materially reduced. It has been found, however, that due to the unsymmetrical magnetization of the magnetic circuits which are so balanced against each other there still remains a tendency for a pulsating unidirectional flux of twice the frequency of the alternating current to thread this circuit. This pulsating flux induces a high voltage alternating E. M. F. in the direct current winding which is liable to break down the insulation thereof.

An object of my invention is to reduce the value of the induced alternating E. M. F. in the direct current winding.

Another object is to provide means for readily adjusting the magnetic and electrical characteristics of the regulating device.

Another object is to reduce the effect of inequalities in manufacture upon the operation of the device.

Another object is to reduce the cost of manufacturing such devices.

Another object is to facilitate replacement of the different parts of the device.

Other objects and advantages will hereinafter appear.

I have discovered that the alternating current component in the direct current circuit can be practically eliminated and the operative characteristics of such a device more readily predetermined and adjusted by using a direct current magnetic core constructed and arranged to provide a relatively high reluctance in the direct current magnetic circuit, and which is also arranged to damp out a large percentage of the alternating current flux which tends to enter the direct current winding.

By the provision of a solid magnetic core for the direct current winding which is spaced or separated from the laminated portion of the reactor by nonmagnetic material, I am able to overcome the difficulties aforementioned in connection with prior devices of this character. By separating or spacing the direct current core from the laminated material by nonmagnetic material I provide a relatively high reluctance in the direct current magnetic circuit, which diminshes the effect of the pulsating flux impulses upon the direct current winding. The provision of a solid magnetic core, or similar means providing a closed or damping electric circuit in or about the direct current core, further assists in accomplishing this result, or in other words in minimizing the alternating current E. M. F. induced in the direct current winding.

Devices of the present type are particularly applicable in regulating the illumination of theatres and the like to gradually decrease or increase the candle power of the electric lamps. In the arrangement illustrated, assuming maximum resistance in the direct current circuit, the current passing through the lamp circuit would be of minimum value, due to the impedance in the circuit resulting from the inductance of the alternating current windings on the laminated magnetic circuit. As the resistance in the direct current circuit is gradually cut out the value of the direct current magnetic flux threading the laminated magnetic circuit increases, thus increasing the reluctance of said magnetic circuit toward the alternating current magnetic flux and thereby reducing the impedance in the alternating current electric circuit.

It has heretofore been thought necessary to make the entire direct current magnetic circuit of as low reluctance as possible, whereas, I have found that it is advantageous to provide a portion of the direct current magnetic circuit of relatively high reluctance. It is preferable that this portion of relatively high reluctance be that part of the direct current magnetic circuit which is not common to the alternating current magnetic circuit, which part in the construction herein illustrated is the direct current core. Such high reluctance in the direct current core may be produced in several ways, as, for instance, by reducing the cross sectional area of the core, or by introducing nonmagnetic spacing material between the same and the laminated magnetic circuit.

Referring to the accompanying drawing,

Figure 1 is a diagrammatic view of my invention applied to a single-phase alternating current circuit;

Figs. 2, 3 and 4 are top plan, side and end elevations, respectively, of one form which the invention may assume in practice, the alternating and direct current windings being omitted from Fig. 2 for the purpose of illustration, and, Fig. 5, is a detail end view of a modified form of direct current core.

Figure 2:
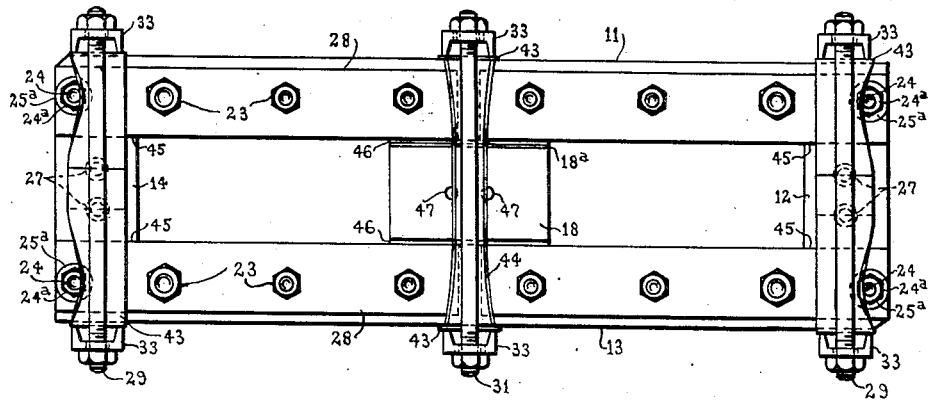

In the drawing (Fig. 1) 10 indicates generally a reactor the laminated portion of which is preferably formed of sections 11 and 13 built up of laminations of like dimensions, and sections 12 and 14 which are similarly built up of laminations of like dimensions. Connected to the main alternating current supply lines $L^1$, $L^2$ is a lamp circuit 15 indicating a load. The circuit 15 is preferably connected in series with a pair of windings 16 and 17 surrounding the sections 12 and 14, respectively.

The reactor 10 is provided with a solid core 18, preferably of steel, the same being spaced or separated from the laminated material by any suitable nonmagnetic material, such as paper, cloth, or the like, or by suitable air gaps.

Mounted upon the core 18 is a winding 19 connected with a suitable source of direct current, such as the battery 20. In circuit with said winding is a rheostat 21 to control or regulate the excitation thereof.

Figure 3:
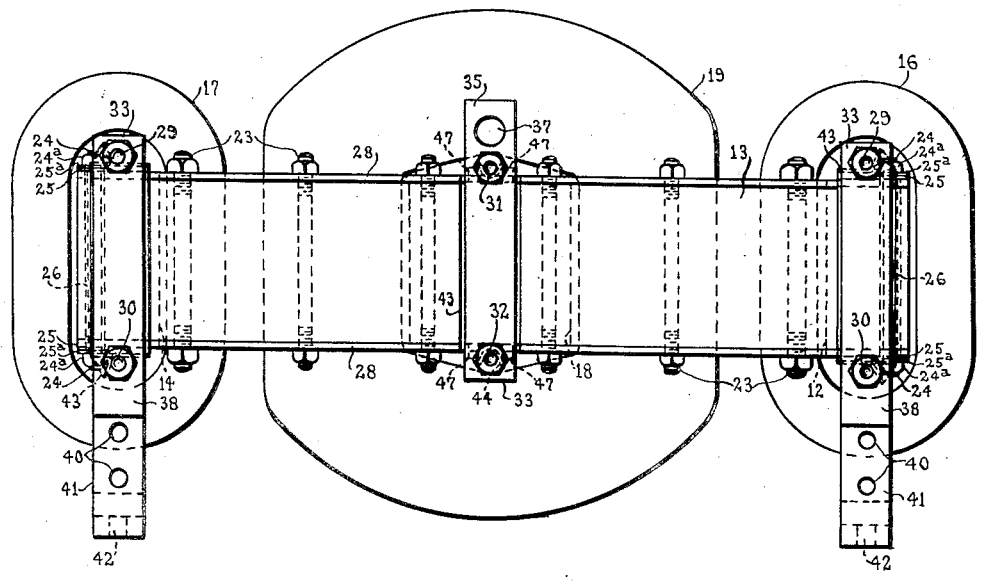

As shown in Figs. 2, 3 and 4, the laminations of the individual sections 11 and 13 are preferably held together by a plurality of bolts 23, the end bolts 24 in each section preferably being insulated from the laminations by insulating washers 25 and tubular insulating members 26 inasmuch as they are not located at the center of the magnetic flux path. Metallic washers $25^a$ are preferably interposed between the nuts $24^a$ and the insulating washers 25 to prevent cutting of the latter. The laminations of sections 12 and 14 are preferably fastened together by rivets 27 or the like. Each laminated section is provided with metallic reinforcing strips 28 on opposite sides thereof. When thus built up the laminated sections 12 and 14 are inserted in the alternating current windings 16 and 17, and the core member 18 is inserted in the direct current winding 19. The laminated sections 11 and 13 are then placed on opposite sides thereof, and the parts are clamped or held together by any suitable means such as by end pairs of bolts 29 and 30 and a central pair of bolts 31 and 32, the bolts of each pair engaging bars 33 preferably of channel shape, on opposite sides of the device. The central channel bars are provided with upwardly extending portions 34 and 35, having eyes or openings 36 and 37, respectively, to receive hooks or the like for lifting the device. The end channel bars are provided with downwardly extending portions 38 and 39 to each of which is secured by rivets 40 or the like a foot member 41, preferably of brass, said members being provided with openings 42 to receive suitable means for fastening the device to a base or bed plate (not shown). Each of the channel members is preferably insulated from the sections 11 and 13 of laminated material in any suitable manner, as by strips or sheets 43 of leatheroid, paper, oiled cloth, or the like. The clamping bolts 29, 30, 31 and 32 are also insulated from the several parts of the device by similar strips 44 of insulating material. The contacting portions of the several laminated sections are preferably machined to provide close fitting surfaces as indicated at 45 in Fig. 2, the reinforcing strips 28 assisting in the machining operation by holding the edges of the laminations in rigid position.

For adjusting or changing the thickness of the nonmagnetic material 46 between the core 18 and the laminated material, I preferably provide one or more shims $18^a$ of the same material as the core 18. The shims $18^a$ may be of different thicknesses to permit use of different combinations thereof. Upon removal of one or more of the shims $18^a$, a corresponding thickness of nonmagnetic material 46 is inserted in place thereof, or vice versa. The space between the core 18 and the laminated sections may also be varied by additional tightening of the bolts 31 and 32 after the parts are in assembled position. Such tightening of the bolts 31 and 32 causes a slight inward bending of the laminated material, which adjustment may be very finely calibrated. The core 18 is preferably held in proper position by studs or pins 47 or the like engaging the insulated bolts 31 and 32.

In Fig. 5 I have shown a direct current core member 18 having one or more pairs of removable side sections 48 and 49 which may be held in position by metal dowels 50. Upon removal of one or more of said sections I preferably substitute therefor a suitable non-magnetic material of like dimensions, to prevent relative movement of the direct current winding upon the core.

It will be apparent that by the aforementioned adjustments I may change or modify the characteristics of the present device in many respects, to provide flexibility and adaptability of the same in practice. Thus, by reducing or restricting the size of the direct current core the maximum direct current excitation is increased more than the minimum direct current excitation; whereas by increasing the space between said core and the laminated portion of the reactor the minimum direct current excitation is increased more than the maximum direct current excitation. I have therefore provided a regulator having a wide range of adjustments according to the particular characteristics desired.

Due to the non-magnetic spacing means between the direct current core and the alternating current magnetic circuit the direct current ampere turns in the direct current winding do not have to be decreased so much to provide for maximum impedance in the alternating current circuit, thus not requiring so high a control resistance in the rheostat in series with the direct current winding. While more direct current ampere turns are required to obtain minimum impedance in the alternating current circuit, the percentage increase in ampere turns necessitated by the present construction is actually very small, due to the fact that under this condition the magnetic circuit is saturated.

Although I have shown the laminated magnetic circuit as formed of two different sizes of laminations, it may be formed in various ways. Thus I may make the same of two identical sections of substantially L-shape, requiring but one form or size of laminations.

What is claimed is:

1. In a device for regulating electric circuits, the combination with a reactor having portions separated from each other by non-magnetic material, an alternating current winding on one of said portions, and a direct current winding on another of said portions.

2. In a device for regulating electric circuits, the combination with a reactor having portions separated from each other by non-magnetic material, an alternating current winding on one of said portions, a direct current winding on another of said portions, and means for varying the energization of said direct current winding.

3. In a device for regulating electric circuits, the combination with a reactor having portions thereof spaced from each other, one of said portions having alternating current coils mounted thereon and the other portion being formed of material having relatively high reluctance toward passage of alternating current magnetic flux and having direct current coils mounted thereon.

4. A device for regulating alternating current electric circuits, comprising a reactor having a portion formed of laminated magnetic material upon which an alternating current winding is mounted and a separate portion of solid magnetic material upon which a direct current winding is mounted.

5. In a device for regulating alternating current circuits, the combination with a reactor having a magnetic circuit subjected to magnetization by an alternating current winding, a solid magnetic core subjected to magnetization by a direct current winding, and means permitting passage of non-pulsating magnetic flux into said alternating current magnetic circuit while preventing passage of pulsating magnetic flux into said direct current winding.

6. In a device for regulating alternating current electric circuits, the combination with a reactor having a portion formed of laminated magnetic material upon which an alternating current winding is mounted and a separate portion of solid magnetic material spaced therefrom upon which a direct current winding is mounted, and means for varying the energization of said direct current winding.

7. In a device for regulating alternating current electric circuits, the combination with a laminated magnetic circuit having alternating current windings thereon, of means for subjecting said magnetic circuit to varying degrees of direct current magnetization comprising a direct current winding having a core arranged adjacent to but spaced from said magnetic circuit said core providing a damping electric circuit, and means for regulating the energization of said direct current winding.

8. In a device for regulating the energization of alternating current electric circuits, the combination with a laminated circuit adapted to be subjected to simultaneous magnetization by direct and alternating currents, means for effecting said alternating current magnetization comprising alternating current windings on said laminated circuit, means for effecting said direct current magnetization comprising a core adjacent to but definitely spaced from said laminated circuit, providing a damping electric circuit and a direct current winding on said core adapted to be subjected to varying degrees of excitation.

9. In a device for regulating the energization of alternating current electric circuits, the combination with a laminated circuit adapted to be subjected to simultaneous magnetization by direct and alternating currents, means for effecting said alternating current magnetization comprising alternating current windings on said laminated circuit, means for effecting said direct current magnetization comprising a core adjacent to but spaced from said laminated circuit by nonmagnetic material and providing a damping electric circuit, means for varying the space between said core and said laminated circuit, and a direct current winding on said core adapted to be subjected to varying degrees of excitation.

10. In a device for regulating alternating current electric circuits, the combination with a reactor having a portion formed of a plurality of built up sections of laminated magnetic material, alternating current windings thereon, a direct current winding for said reactor having a core of magnetic material adjacent to but separated from said laminated portion and providing a damping electric circuit, and means for varying the energization of said direct current winding.

11. In a device for regulating alternating current electric circuits, the combination with a reactor having a circuit of laminated magnetic material, a core member of magnetic material inserted within said laminated circuit but separated therefrom at each end by nonmagnetic material and providing a damping electric circuit, an alternating current winding on said laminated circuit, and a direct current winding on said core.

12. In a device for regulating alternating current electric circuits, the combination with a reactor having a circuit of laminated magnetic material, a core member of magnetic material within said laminated circuit but separated therefrom at each end by nonmagnetic material and providing a damping electric circuit, alternating current coils on said laminated circuit, direct current coils on said core, and means for clamping said parts in assembled position.

13. In a device for regulating alternating current electric circuits, the combination with a reactor having a portion formed of laminated material adapted for simultaneous magnetization by direct and alternating currents and a removable solid core having separable sections of magnetic material, an alternating current winding on said laminated material, and a direct current winding on said core.

14. In a device for regulating alternating current electric circuits, the combination with a reactor having a portion thereof formed of laminated material adapted for simultaneous magnetization by direct and alternating currents and a removable solid core having separable sections of magnetic material, and a direct current winding on said removable core, said sections being separable to provide for adjustment of the relation between the excitation of said direct current winding and the resulting unidirectional magnetic flux.

15. In a device for regulating alternating current electric circuits, the combination with a reactor having a portion formed of laminated material adapted for simultaneous magnetization by direct and alternating currents, a removable solid core including separable sections of magnetic material adjacent to but spaced from said laminated material, an alternating current winding on said laminated material and a direct current winding on said core, said separable sections being adapted to provide for variation of the cross sectional area of said core.

16. In a device for regulating electric circuits, the combination with a reactor having portions separated from each other by nonmagnetic material, an alternating current winding interlinked with one of said portions, and a direct current winding interlinked with another of said portions.

17. In a device for regulating electric circuits, the combination with a reactor having a portion on which alternating current windings are mounted, and a separate portion on which a direct current winding is mounted, said latter portion being arranged in spaced relation to said first-mentioned portion to provide for the direct current magnetic flux a path which has relatively high reluctance toward passage of alternating magnetic flux.

18. In a device for regulating the impedance of alternating current electric circuits between given limits, the combination with a direct current winding for supplying a maximum and a minimum excitation for varying said impedance, of adjustable means providing for variation of the required maximum and minimum excitation simultaneously by different amounts, said means comprising a solid steel core for said winding, and a plurality of removable sections associated with said core.

In witness whereof, I have hereunto subscribed my name.

CLARENCE T. EVANS.